(12) United States Patent
Suontausta

(10) Patent No.: US 7,583,680 B1
(45) Date of Patent: Sep. 1, 2009

(54) METHOD AND ARRANGEMENT FOR TRANSMITTING INFORMATION BETWEEN SUBSYSTEMS IN HYBRID CELLULAR TELECOMMUNICATION SYSTEMS

(75) Inventor: Panu Suontausta, Tampere (FI)

(73) Assignee: Nokia Corporation, Espoo (FI)

( * ) Notice: Subject to any disclaimer, the term of this patent is extended or adjusted under 35 U.S.C. 154(b) by 1012 days.

(21) Appl. No.: 10/130,894

(22) PCT Filed: Nov. 24, 2000

(86) PCT No.: PCT/FI00/01021

§ 371 (c)(1), (2), (4) Date: Jul. 16, 2002

(87) PCT Pub. No.: WO01/39535

PCT Pub. Date: May 31, 2001

(30) Foreign Application Priority Data

Nov. 26, 1999 (FI) .................................. 19952529

(51) Int. Cl.
H04L 12/28 (2006.01)
H04J 3/22 (2006.01)
H04J 3/24 (2006.01)
(52) U.S. Cl. .................. 370/401; 370/466; 370/349
(58) Field of Classification Search .............. 370/402, 370/310.2, 328, 338, 401, 395.5, 349, 358, 370/391, 466
See application file for complete search history.

(56) References Cited

U.S. PATENT DOCUMENTS 5,901,142 A * 5/1999 Averbuch et al. ............ 370/329
6,075,789 A * 6/2000 Kasslin et al. .............. 370/338

(Continued)

FOREIGN PATENT DOCUMENTS

EP 0 483 547 A1 5/1992

(Continued)

OTHER PUBLICATIONS

Groβ, Bernd; Integration von GSM und Intranet:; Funkschau, No. 18, (1998) pp. 58-60.

Primary Examiner—Chi H Pham
Assistant Examiner—Warner Wong
(74) Attorney, Agent, or Firm—Squire, Sanders & Dempsey L.L.P.

(57) ABSTRACT

The invention relates to a method (400, 500) for establishing control information about a mobile station, in where first characteristics of the mobile station communicating with the cellular subsystem of a hybrid cellular telecommunication system are established (301) in said cellular subsystem using methods that are defined for the cellular subsystem, the cellular subsystem is connected to a non-cellular subsystem, and second characteristics of terminals connected to the non-cellular subsystem are established in said non-cellular subsystem using methods that are defined for the non-ellular subsystem. The method according to the invention is characterized in that said first characteristics of the mobile station are transmitted between a certain translation entity and the cellular subsystem using methods that are defined for the cellular subsystem, transmitted first characteristics are translated (402) to certain second characteristics of the mobile station and said second characteristics of the mobile station are transmitted (311, 312) between the translation entity and the non-cellular subsystem using methods that are defined for the non-cellular subsystem. The invention also relates to network elements (600, 610) and to a translation arrangement (601).

21 Claims, 6 Drawing Sheets

U.S. PATENT DOCUMENTS

| | | | | |
|---|---|---|---|---|
| 6,154,465 A | * | 11/2000 | Pickett | 370/466 |
| 6,347,091 B1 | * | 2/2002 | Wallentin et al. | 370/437 |
| 6,356,761 B1 | | 3/2002 | Huttunen et al. | 455/456 |
| 6,359,896 B1 | * | 3/2002 | Baker et al. | 370/410 |
| 6,404,754 B1 | * | 6/2002 | Lim | 370/338 |
| 6,539,237 B1 | * | 3/2003 | Sayers et al. | 455/555 |
| 6,556,820 B1 | * | 4/2003 | Le et al. | 455/411 |
| 6,594,253 B1 | * | 7/2003 | Sallberg et al. | 370/349 |
| 6,687,243 B1 | * | 2/2004 | Sayers et al. | 370/356 |
| 6,795,444 B1 | * | 9/2004 | Vo et al. | 370/401 |
| 6,868,090 B1 | * | 3/2005 | Ma et al. | 370/469 |
| 6,888,803 B1 | * | 5/2005 | Gentry et al. | 370/259 |
| 6,891,811 B1 | * | 5/2005 | Smith et al. | 370/310 |
| 6,975,634 B1 | * | 12/2005 | Chow et al. | 370/401 |
| 7,031,707 B1 | * | 4/2006 | Rune et al. | 455/433 |
| 7,099,295 B1 | * | 8/2006 | Doyle et al. | 370/338 |
| 7,209,457 B1 | * | 4/2007 | Leuca et al. | 370/328 |
| 7,257,122 B1 | * | 8/2007 | Keturi | 370/401 |
| 7,346,024 B2 | * | 3/2008 | Lee | 370/328 |
| 2003/0202521 A1 | * | 10/2003 | Havinis et al. | 370/401 |

FOREIGN PATENT DOCUMENTS

| | | |
|---|---|---|
| EP | 0 883 313 A2 | 12/1998 |
| FI | 102933 B | 6/1998 |
| FI | 105311 B | 5/1999 |
| WO | WO 98/27698 | 6/1989 |
| WO | WO 9533348 A1 * | 12/1995 |
| WO | WO 98/05178 | 2/1998 |
| WO | WO 99/25138 | 5/1999 |

* cited by examiner

METHOD AND ARRANGEMENT FOR
TRANSMITTING INFORMATION BETWEEN
SUBSYSTEMS IN HYBRID CELLULAR
TELECOMMUNICATION SYSTEMS

PRIORITY CLAIM

This is a national stage of PCT application No. PCT/FI00/01021, filed on Nov. 24, 2000. Priority is claimed on that application, and on patent application No. 19992529 filed in Finland on Nov. 26, 1999.

FIELD OF THE INVENTION

The invention relates in general to telecommunication systems that combine cellular telecommunication networks with other networks. The invention relates in particular to transmitting information between subsystems that employ different standards.

BACKGROUND OF THE INVENTION

Traditionally separate networks have been used for transferring data and voice. Data is nowadays transferred mainly in packet based networks, especially in Internet Protocol (IP) networks. These networks can, for example, be simple local area networks (LANs) or complex interconnected corporate networks. Voice calls have traditionally been transmitted in circuit switched networks. In the recent years, however, there has been an explosive growth in real-time data applications that use packet based networks like the Internet as transport medium. These real-time applications can support voice and videocalls, and, for example, the IP-calls are expected to be less expensive than calls in traditional fixed or mobile networks.

The H.323 specification has been created by the International Telecommunications Union (ITU) for the purpose of defining a standard framework for audio, video and data communications over networks that do not provide a guaranteed quality of service (QoS). Packet based networks, for example, can be such networks. The aim of the H.323 specification is to allow multimedia products and applications from different manufacturers to interoperate. The H.323 specification defines functionality for call control, multimedia management, and bandwidth management as well as interfacing between networks. The H.323 specification defines four major components for a network-based communications system: terminals, gateways, gatekeepers, and multipoint control units. H.323 terminals, gateways and gatekeepers will be shortly described in the following. The multipoint control unit is needed for conference calls, where there are at least three participants.

A terminal is a client device in the network. It typically provides real-time, two-way communication for the user. All H.323 terminals must support voice communications, and they may also support video and data communications. A terminal can be realized using a personal computer, or the terminal may be a stand alone unit such as a conventional telephone. Further examples of terminals are Internet telephones, audio conferencing terminals, and video conferencing terminals.

A gateway is used to connect a H.323 network to other types of networks and/or terminal types. A gateway may, for example, translate information transmission formats or protocols between the networks. A H.323 gateway, which may be distributed, can also participate in call setup and other procedures between the networks.

A gatekeeper functions as a controlling unit for a given section of an H.323 network, i.e. an H.323 zone. A gatekeeper provides call control services to registered endpoints. e.g., H.323 terminals or gateways. Further, a gatekeeper performs address translation between local area network aliases for terminals and gateways to IP or other network addresses. A gatekeeper may also perform bandwidth management, i.e., transmission resource control. Registration, address translation and bandwidth management employ Registration. Admission and Status (RAS) signaling.

The gatekeeper can also be used to route H.323 calls, in which case the calls are under control of the gatekeeper. This allows a simple way of providing many different kinds of services and traffic management features. While the concept of a gatekeeper is logically separate from the concept of a gateway or a multipoint control unit, the gatekeeper can be realized in the same physical device as a gateway or a multipoint control unit.

Usually calls that involve a mobile station are transferred at some point of the connection over fixed lines that are either part of the cellular network or part of the traditional Public Switched Telephone Network (PSTN). Systems that use other fixed networks, especially packet based networks, for transferring at least some of the mobile-originated or mobile-terminated calls have been recently developed. These systems are here called hybrid cellular telecommunication systems, and an example of them is the Rich Call Platform.

Figure 1:
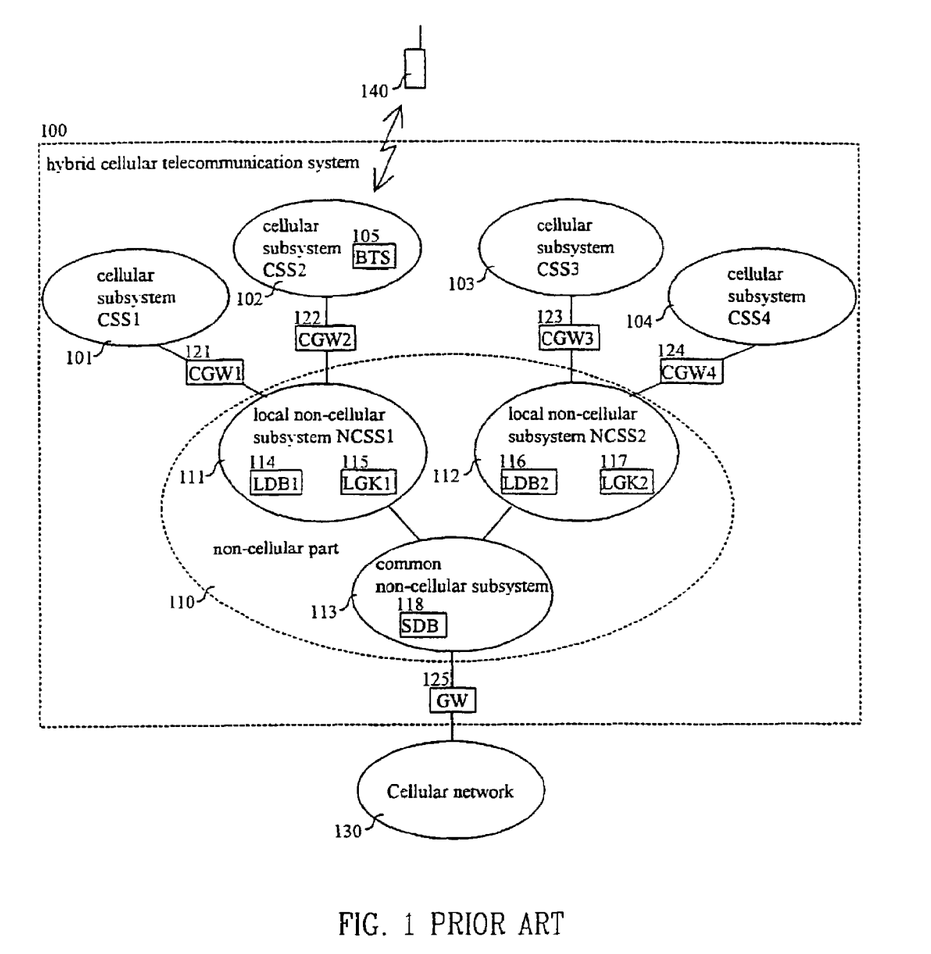
FIG. 1 shows a schematic drawing of a cellular hybrid telecommunication system.

An example of a hybrid cellular communication system is illustrated in FIG. 1. The system 100 comprises cellular subsystems 101-104 which employ cellular techniques that support communications with a mobile station 140. Each of the cellular subsystem contains at least one base station or a corresponding network element, and as an example, FIG. 1 shows the base station 105 in the cellular subsystem 102. The rest of the system 100 may be implemented using other network techniques, for example IP networks and H.323 standard. The non-cellular part 110 of the hybrid cellular telecommunication system includes two local non-cellular subsystems 111 and 112, and a common non-cellular part 113 to which the non-cellular subsystems are connected via, for example, the Internet.

The local non-cellular subsystems 111 and 112 may be in two different premises of a company, and they are used to transmit calls and connections to the mobile stations via the cellular subsystems. The local non-cellular subsystems need to have an entity that routes the calls (corresponding to the H.323 gatekeeper) and a database where to store information about the terminals that are reachable via the cellular subsystems. In FIG. 1 these elements have been presented with local gatekeepers 115 and 117 and local databases 114 and 116. The cellular gateways 121-124 connect a cellular subsystem to a local non-cellular subsystem and they are responsible for making, for example, necessary protocol transformations. The gateways are called here cellular gateways just to differentiate them from the other gateways possibly involved in hybrid cellular telecommunication systems.

When the cellular subsystems of a hybrid cellular telecommunication system cover, for example, all offices and buildings of a company, mobile calls from one office to another can be made using the non-cellular part of the system as fixed transmission media. The calls need not go through public cellular or fixed telephony networks, i.e. not through the public gateway 125. Especially if the company has offices around the world, this can result in considerable savings in telephony charges.

The hybrid cellular telecommunication system 100 is connected to the public cellular network 130 via the public gateway 125. The public cellular network 130 is typically owned, managed and maintained by a cellular network operator, whereas the cellular subsystems (in FIG. 1, for example, the cellular subsystems 101-104) may be operated, for example, by a cellular network operator or by the company in whose premises the cellular subsystems are.

Both calls and signaling information may be passed through the public gateway 125. Calls where the other endpoint is not within the hybrid cellular telecommunication system are routed through the public cellular network 130 in the example presented in FIG. 1. The common non-cellular part 113 to which the gateway 125 is connected, may be in the premises of the cellular network operator. Information about the mobile stations and subscribers that are allowed to use the hybrid cellular telecommunication system needs to be stored in the system, for example in a subscriber database 118.

In a sense, the hybrid cellular telecommunication system is an extension to the public cellular network 130. The hybrid cellular telecommunication system may rely on having access to certain service provided by the public cellular network 130. For example, necessary subscriber information may be fetched from the public cellular network. The public cellular network needs to be notified of the mobile stations that are reachable through the hybrid cellular telecommunication system. Otherwise it cannot, for example, route incoming calls correctly.

Figure 2:
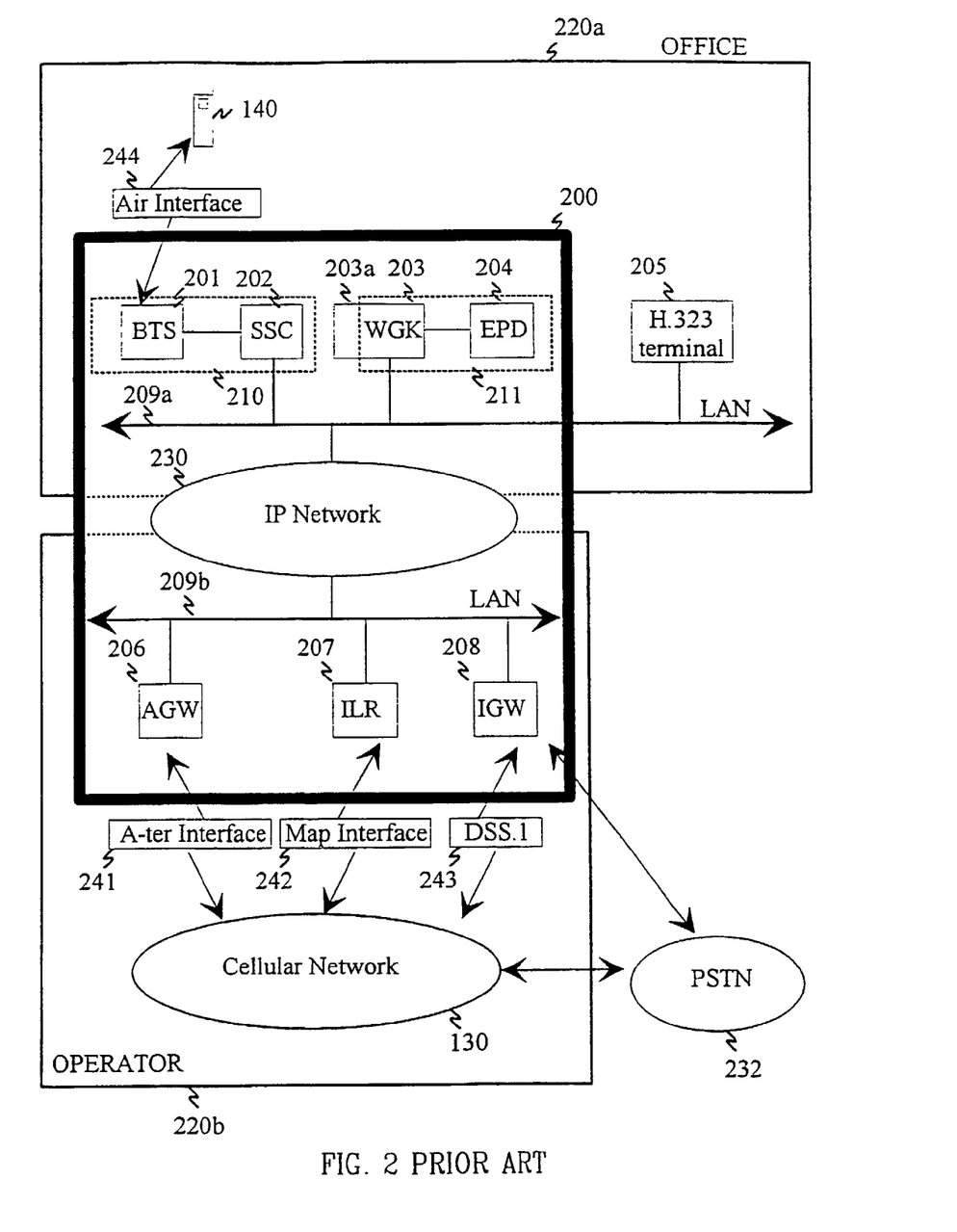
FIG. 2 shows a schematic drawing of a RCP system.

The Rich Call Platform (RCP), which combines parts and subsystems of a certain cellular system and fixed network techniques, is used here as a more tangible example of a hybrid cellular telecommunication system. FIG. 2 presents a schematic drawing of one RCP system 200, which employs Global System for Mobile Communications (GSM) as the cellular system and the combination of H.323 standard and IP network for transmitting part of the calls over fixed network. Part of the RCP system is within the corporate premises 220a. This part comprises a local area network 209a, where the calls and information related to the calls is presented in H.323 format, and at least one cellular subsystem. The LAN 209a is connected via an IP-based network 230 to another LAN 209b which is operated by the cellular network operator 220b and is usually situated in the premises of the cellular network operator. LANs 209a and 209b do not have to be situated in the same premises as long as both are connected to the same IP network 230.

Each of the cellular subsystems situated in the corporate premises 220a comprises one or more Base Transceiver Stations (BTS) 201 and a subsystem controller (SSC, 202 to which the base transceiver stations are connected. In RCP system, the subsystem controller is usually called IMC (Intranet Mobility Cluster). The SSC provides to the BTS same interfaces as BSC, but the actual functionalities are typically distributed between different RCP entities. The SSC acts also as a gateway between the cellular subsystem which it controls and the H.323 part of the RCP system. The SSC 202 is connected to the local area network 209a of the office 220a.

A gatekeeper (WGK) 203 is a H.323 gatekeeper where some GSM features have been added. It is involved in signaling in the RCP system. It acts as a central point for all calls within its zone and provides call control and management services, such as network topology information, update of RCP subscriber information, address translation during call set-up, admission control and bandwidth control. In many ways gatekeeper acts as a virtual switch. Thus gatekeepers are sometimes called also Mobile Telephone Servers (MTS). Each RCP zone can be managed by one gatekeeper.

The cellular subsystem 210 and the non-cellular subsystem 211 of RCP system 200 are presented with dashed lines in FIG. 2. A part 203a of the gatekeeper 203 forms the cellular gateway of the RCP system 200 (corresponding, for example, to the cellular gateway 121 in FIG. 1).

Information about the presence of each mobile station and H.323 compatible terminals 205 in a RCP system is stored in an End Point Database (EPD) 204 which either is connected to the gatekeeper 203 or is a part of the gatekeeper. Using the information stored in the EPD 204 the gatekeeper 203 can determine, if the destination address of the call is within its control zone. This information is needed when setting up calls in the RCP system.

In the second LAN 209b, there are an A-interface Gateway (AGW) 206 and an Intranet Location Register (ILR) 207. The A-interface gateway 206 handles communications between the RCP system 200 and the public cellular network 130 via a A-ter-type interface 241. The A-ter interface is an interface normally found between Transcoder Submultiplexer (TCSM) and Base Station Controller in GSM-networks. Therefore the communications between the RCP system 200 and the public cellular network 130 can be handled like normal communications between Base Stations Subsystem and the public cellular network 130, the RCP-system 200 acting like a normal Base Station Subsystem from the view point of the public cellular network 130. The AGW is responsible for converting speech and data streams and signaling between the public cellular network and the H.323 part of the RCP system. If the RCP systems employs some other cellular network standard than GSM, the functionality of the AGW (or a corresponding gateway with a different name) is defined by the relevant cellular network standards.

The main function of a ILR database 207 is to store mobility management information of the subscribers using the RCP-system 200. For all subscribers that have a right to use the RCP system, there is a permanent entry in the ILR. The ILR contains both RCP-specific information, such as the IP address of the gatekeeper at whose control zone the mobile station currently is, and GSM-specific information, which is practically the same information as stored in the Visitor Location Register (VLR). The gatekeeper 203 is responsible for updating the RCP-specific information in the ILR, and the communications between ILR 207 and public cellular network 130 are handled via a MAP-interface 242. The MAP interface is a standard GSM-interface normally found between Home Location Register (HLR) and Mobile Services Switching Centre (MSC). Therefore the mobility management information from the RCP system 200 is handled from the view point of the cellular system 130 just like mobility management information of a normal GSM subscriber.

When a mobile station 140 is used in an office 220a where the RCP system 200 is present, the call is received by a BTS 201, just as in normal cellular networks. The SSC 202 transforms the data which it receives from the mobile station 140 and which is carried by the uplink radio connection to IP packets according to the H.323 standard. It sends the packets further to the local area network 209a. Respectively, when data is transferred from the local area network 209a via the BTS 201 to the mobile station 140, the SSC 202 transforms received H.323 information to the suitable cellular network standard format understood by the BTS 201.

The gatekeeper 203 is responsible for the signaling involved in setting up a call. If the destination address is within the gatekeeper's control zone and the destination is H.323 terminal 205, then the connection is made directly with the H.323 terminal 205. If the destination is a mobile station 140 within the control zone of the gatekeeper 203, then the call is directed via the SSC 202 to the BTS 201 and further to the mobile station 140. If a call is made from the mobile station 140 to another RCP zone, the call is directed to the gatekeeper controlling the other RCP zone. If the destination is a mobile station, the two SSCs through which the mobile stations are reachable, are informed to establish the call.

When a call is made from the RCP system 200 to a destination that is a mobile phone reachable through the public cellular network 130 (either the mobile station owner being a RCP subscriber outside the RCP system coverage or being not at all a RCP subscriber), the gatekeeper 203 transfers the call via the packet switched network like Internet to the A-interface Gateway 206. As stated above the AGW 206 communicates with the public cellular network 130 through an A-ter interface 241. Therefore the public cellular network 130 handles the call like any normal mobile station call received by a MSC and connects the call using network specific methods and systems known per se.

If the call is made from a H.323 terminal 205 to a PSTN 232 or to a public cellular network 130, then the communication is handled by an ISDN Gateway (IGW) 208. The IGW 208 communicates with the public cellular network 130 via DSS.1 interface 243 thus looking form the point of view of the public cellular network 130 like a PBX (Private Branch exchange). This makes it possible for H.323 terminal 205 to communicate with other mobile stations than those within the RCP system using the public cellular network 130. The IGW also handles the communications between the RCP system 200 and the PSTN network 232, and this enables the H.323 terminals to communicate with the PSTN network 232. The calls made from a mobile station 140 to PSTN network 232 can be handled either via the AGW 206 using the systems in the public cellular network 130 to connect the call to the PSTN network 232 or the call can be connected to the PSTN network 232 using the IGW 208.

In the RCP system 200 calls between mobile stations use GSM speech coding. If a mobile originated call is routed through the public cellular network to a fixed phone, the public cellular network will take care of decoding the speech. If one endpoint of a call is a mobile station in the RCP system 200 and the other is H.323 terminal, there is maybe need for decoding and re-coding the speech between the GSM coding and coding methods defined in H.323 standard.

In the RCP system 200 and in other hybrid cellular telecommunication systems which combine elements from cellular networks and other networks, different parts of the system usually employ different standards for signaling. When an entity enters a cellular subsystem and calls to it have to be routed through the non-cellular subsystem, the entity has to inform the non-cellular subsystem about its identity and, for example, through which cellular gateway it is in connection to the non-cellular subsystem. The problem here is that the cellular network entity typically has no common signaling features with the non-cellular network.

For example, the terminals that are reachable through the RCP system need to register themselves with the gatekeeper. A standard mobile station, however, is unlikely to support RAS signaling that is used for informing the gatekeeper to which network address a certain H.323 alias is connected. If the gatekeeper is unaware of the network address, it cannot, for example, direct incoming calls.

It would be possible to modify a mobile station so that it supports RAS signaling or other methods used in the non-cellular subsystems, but this would be tedious and only those mobile stations that have been modified could be used in the hybrid cellular telecommunication system. Similarly, it is possible to modify the gatekeeper of the non-cellular subsystem, to support cellular features. But in this case, when a cellular subsystem is added, for example, to an H.323 system, the gateway has to be modified.

SUMMARY OF THE INVENTION

The object of the present invention is to provide a method for establishing information in a hybrid cellular telecommunication system about entities that employ different standards. A further object is to provide a method that can be supported by only adding one network entity in each of the subsystems in a hybrid cellular telecommunication system. Especially the object is to provide information about mobile station accessible to a standard non-cellular gatekeeper.

This and other objects of the invention are achieved by a translation entity that communicates with each subsystem of a hybrid cellular telecommunication system using the methods that the subsystem supports and that translates the information it receives from one of the subsystems to a form that is eligible to another subsystem.

A method according to the invention for establishing control information about a mobile station for controlling connections having one endpoint at said mobile station, said connections traversing at least a cellular subsystem of a hybrid cellular telecommunication system and being routed in said hybrid cellular telecommunication system by a non-cellular subsystem of said hybrid cellular telecommunication system, in where first characteristics of the mobile station communicating with the cellular subsystem of the hybrid cellular telecommunication system are established in said cellular subsystem using methods that are defined for the cellular subsystem, the cellular subsystem is connected to a non-cellular subsystem, and second characteristics of terminals connected to the non-cellular subsystem are established in said non-cellular subsystem using methods that are defined for the non-cellular subsystem, is characterized in that said first characteristics of the mobile station are transmitted between a certain translation entity and the cellular subsystem using methods that are defined for the cellular subsystem, transmitted first characteristics are translated to certain second characteristics of the mobile station in the translation entity, said second characteristics of the mobile station are transmitted to the non-cellular subsystem using methods that are defined for the non-cellular subsystem, and storing said second characteristics as control information in the non-cellular subsystem.

A translation arrangement according to the invention for establishing control information about a mobile station in a non-cellular subsystem of a hybrid cellular telecommunication system for controlling connections having one endpoint at said mobile station, said connections traversing at least a cellular subsystem of said hybrid cellular telecommunication system and being routed in said hybrid cellular telecommunication system by said non-cellular subsystem, is characterized in that the arrangement has means for communicating with a cellular subsystem of a hybrid cellulai telecommunication system using protocols that are defined for the cellular subsystem, has means for communicating with the non-cellular subsystem using protocols that are defined for the non-cellular subsystem, has means for establishing certain first characteristics of a mobile station, and has means for translating certain first characteristics of a mobile station to certain second characteristics of a terminal entity and for translating certain second characteristics of a terminal entity to certain first characteristics of a mobile station.

The invention relates to a network element of the cellular subsystem of the hybrid cellular telecommunication system which element has means for communicating with the cellular subsystem and which is characterized in that the element has has means for establishing certain characteristics of a mobile station and means for exchanging information about said characteristics with a certain network element of the non-cellular subsystem of the hybrid telecommunication system, in order to establish in said non-cellular subsystem control information for controlling connections having on endpoint at said mobile station, traversing at least a cellular subsystem of said hybrid cellular telecommunication system and being routed in said hybrid cellular telecommunication system by said non-cellular subsystem.

A network element of the non-cellular subsystem of the hybrid cellular telecommunication system according to the invention, which element has means for communicating with the non-cellular subsystem, is characterized in that means for communicating with the non-cellular subsystem comprise means for exchanging information about certain characteristics of a terminal and the element has means for exchanging information about said characteristics with a certain network element of the cellular subsystem of the hybrid telecommunication system, in order to establish in said non-cellular subsystem control information for controlling connections having one endpoint at said terminal, traversing at least part of said hybrid cellular telecommunication system and being routed in said hybrid cellular telecommunication system by said non-cellular subsystem.

In the method according to the invention a mobile station is communicating with a cellular subsystem of a hybrid cellular telecommunication system. A cellular gateway, for example, connects the cellular subsystem to a non-cellular subsystem. The gateway is called here a cellular gateway just to differentiate it from the other gateways possibly involved in hybrid cellular telecommunication systems.

The mobile station signals information about its identity to the cellular subsystem. It may use the signaling defined for the cellular network and need not to know that the cellular subsystem is attached to a non-cellular subsystem. After the signaling messages the cellular subsystem is aware of the endpoint's identity and location. Term characteristics refers here to information about a mobile station's identity, its location or possibly to some other features of the mobile station. For example, if there are mobile stations that can transmit videocalls, the characteristics may comprise information about video capability. When characteristics are transmitted or translated, only the required or necessary characteristics may be processed. In the method according to the invention, it is not necessary to transmit all the characteristics of a mobile station. It is sufficient to transmit the relevant part of the characteristics.

In the method according to the invention, a translation entity communicates with the cellular subsystem using the protocols that are defined for the cellular subsystem. It receives from the cellular subsystem the characteristics of the mobile station. These characteristics are translated to a form the non-cellular subsystem understands. Usually at least a proper identifier and a proper network address have to be determined for the mobile station. The proper network address is generally the address of the cellular gateway through which the connections related to the mobile station pass. The address for the mobile station may be specified explicitly or, if the translation entity is implemented in the cellular gateway, the address may be deduced, for example, by the name or address of the gateway that transmits information about the mobile station to the non-cellular subsystem.

In the method according to the invention, the characteristics of the mobile station that are translated to a form that the non-cellular subsystem supports are communicated to the non-cellular subsystem using protocols that the non-cellular subsystem supports. In general, a subsystem that is able to route calls to and from terminals needs a database or a corresponding entity to store information about the subsystem. The characteristics of a mobile station may be inserted, for example, to the same database. For example, in the RCP system the IP address of the cellular gateway which is serving the mobile station, can be set as the mobile station's network address to a database where information about the elements of the H.323 network is stored.

Usually the non-cellular subsystem has its own procedures for establishing information about itself. In an H.323 subsystem, for example, information to the database is inserted by the H.323 gatekeeper after RAS signaling between the gatekeeper and an H.323 endpoint. In the method according to the invention, characteristics of a mobile station can be directly inserted to a database, for example, by opening a data transfer connection and defining a protocol between the cellular subsystem and the database. The non-cellular subsystem has access to the information in the database using similar methods as when it needs information about the entities within the non-cellular subsystem itself. The non-cellular subsystem or its elements, other than the database (or a part of the database) which is part of the translation entity, need not to be aware of the non-standard information transfer to the database.

Another option to transmit the characteristics of a mobile station to the non-cellular subsystem is to use signaling which is employed in the non-cellular subsystem. In this case the translation entity needs to be able to communicate according to the non-cellular standards. The characteristics may be transmitted directly to a gatekeeper entity using, for example, RAS signaling in a H.323 subsystem. In this case the database, where information about the H.323 entities is stored, does not have to be a part of the translation entity.

One advantage of the invention is that in both above mentioned options the mobile station that registers itself to the non-cellular subsystem need not be modified to support non-cellular signaling. A further advantage is that there is no need to modify the network elements of the non-cellular subsystem, either. Specifically, a standard gatekeeper can route calls to a mobile station. It is enough to add a translation entity to the hybrid cellular telecommunication system, and other elements of the system may be standard network elements without specific modifications.

There are many possibilities to construct the translation entity and to place it to the hybrid cellular telecommunication system. The translation entity may be a part of the cellular subsystem, for example a modified network element of the cellular subsystem. It may alternatively be implemented in the cellular gateway. It is also possible that, for example, the database entity of the non-cellular subsystem is modified so that it supports the signaling methods that are used in the cellular subsystem and that it is able to make a translation between the characteristics of a mobile station and the characteristics of, for example, an H.323 endpoint. In this last case, the modified database entity constitutes the translation entity.

A further advantage of the method according to the invention is that the transmission of characteristics from the cellular subsystem to the non-cellular subsystem may be initiated either by the mobile station (or a part of the cellular subsystem) or, for example, by the gatekeeper entity of the non-cellular subsystem.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

The invention will now be described more in detail with reference to the preferred embodiments by the way of example and to the accompanying drawings where.

DETAILED DESCRIPTION OF THE PRESENTLY PREFERRED EMBODIMENTS

Above in conjunction with the description of the prior art reference was made to FIGS. 1 and 2.

Figure 3A:
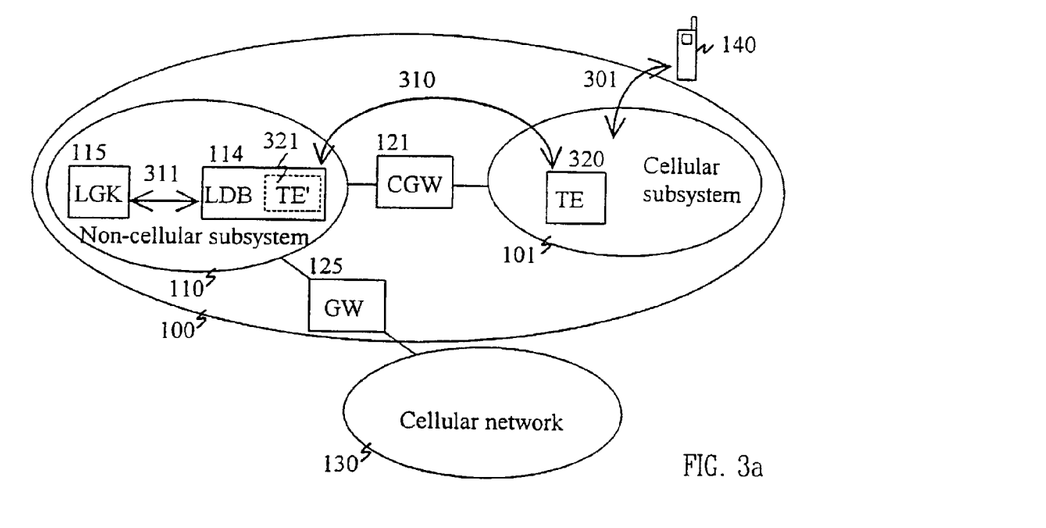
FIG. 3 shows a schematic drawing of a first preferred embodiment of the method according to the invention.
Figure 3B:
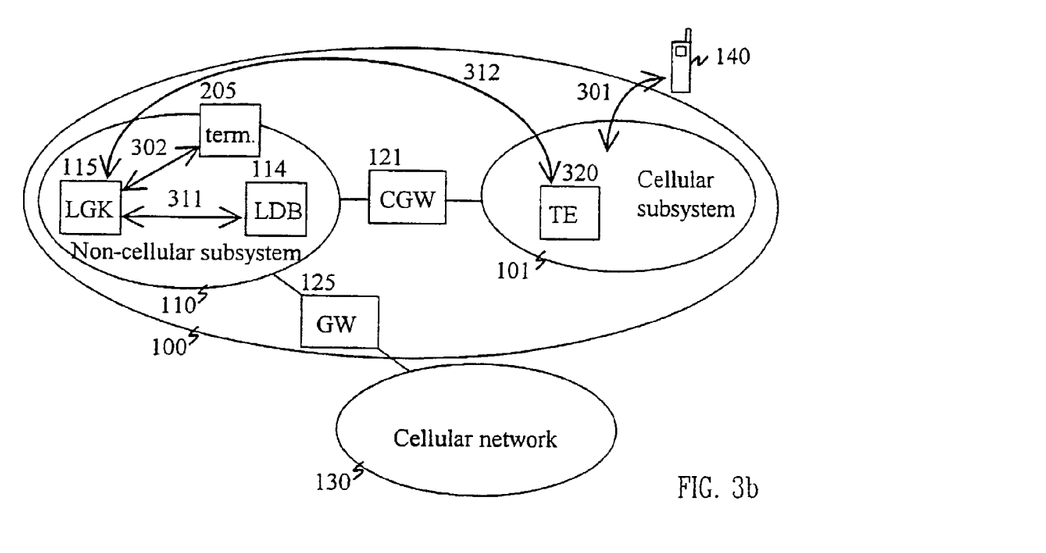

FIGS. 3a and 3b illustrate the first preferred embodiment of the method according to the invention. The hybrid cellular telecommunication system 100 comprises a non-cellular subsystem 110 and a cellular subsystem 101. They are connected to each other with a cellular gateway 121. The non-cellular subsystem is connected to a public cellular network 130 with a gateway 125. The public cellular network 130 is not a part of the hybrid cellular telecommunication system. The non-cellular subsystem 110 comprises a local gatekeeper 115 and a local database 114, where information about the entities within the non-cellular subsystem is stored. The mobile station 140 is reachable from the public cellular network via the hybrid cellular telecommunication system.

When the mobile station 140 arrives to the area covered by the cellular subsystem, it registers itself with the cellular subsystem. This signaling is marked in both FIGS. 3a and 3b with arrow 301 and the messages and their sequence is typical for the cellular network. The mobile station does not need to be aware of the non-cellular subsystem being part of a hybrid cellular telecommunication system.

After the mobile station has registered itself, the cellular subsystem communicates the characteristics of the mobile station to a translation entity. In FIGS. 3a and 3b the translation entity TE 320 is located in the cellular subnetwork. It may be, for example, merged to a SSC of the RCP system. It may alternatively be, for example, in the cellular gateway 121. A third option is that the translation entity is, for example, in the non-cellular subsystem and, more specifically, it may be merged with the local database 114.

The translation entity 320 transforms the registration information to such a format which the non-cellular subsystem, for example the local gatekeeper 115, can use. The gatekeeper needs usually at least a name with which it refers to the mobile station and an address where to route incoming calls. The phone number connected to the mobile station, for example, can be used as the name of the mobile station and the address of the cellular gateway 121 can be defined as the mobile station's address. The cellular gateway is responsible for routing the calls further to the right mobile station. In addition to the name and address the characteristics may, for example, comprise information about the mobile station equipment.

Once the characteristics that need to be transferred to the non-cellular subsystem are defined, they are transmitted there. In FIG. 3a arrow 310 shows how the characteristics are inserted directly to the database 114. This can be done, for example, by opening a TCP/IP connection between the database and an element of the cellular subsystem. Usually for a database there is a command set using which the contents of a database can be modified or updated. In this case, the part 321 of the database that receives the characteristics and inserts them to the actual database 144 forms a part of the translation entity 320. It is also possible that the characteristics are transmitted to the local database 114 in the form they are received from the cellular subsystem, and translated only in the database to a form that is eligible for the non-cellular subsystem. Again, the part of the database that receives the characteristics, translates them and inserts the translated characteristics to the database forms a part of the translation entity. The local gatekeeper 115 has access to the information that is stored the local database 114 (arrow 311).

The information about the cellular entity can also be inserted to the database via the gatekeeper. This is illustrated in FIG. 3b with arrow 312. The translation entity 320 may use signaling that is specified for the non-cellular subsystem to transmit the characteristics to the local gatekeeper 115 (arrow 312). Thereafter the local gatekeeper 115 inserts the characteristics to the local database 114 (arrow 311). The local gatekeeper is not necessary aware of the translation entity. The local gatekeeper 115 may assume that a standard terminal of the non-cellular subsystem, such as terminal 205 which is presented in FIG. 3b, is registering itself A standard terminal of the non-cellular subsystem, for example an H.323 terminal, communicates its identity and network address to the local gatekeeper 115 with signaling (arrow 302) that is specific for the non-cellular subsystem. The signaling can be, for example, RAS signaling in H.323 subsystem. The signaling presented with arrow 312 may thus be similar to that presented with arrow 302.

When describing the further preferred embodiments of the methods according to the invention, the GSM network is used as an example of a cellular network. The cellular subsystem of the hybrid cellular telecommunication system is assumed to comprise GSM network elements and the non-cellular subsystem is assumed to employ H.323 standard. These choices do not restrict the scope of the invention, they merely act as examples.

The second preferred embodiment of the method according to the invention uses the location updating messages the mobile station sends. The mobile station sends these location updating messages to keep the cellular network aware of its location. This way incoming calls, for example, can be routed to the correct place.

Figure 4:
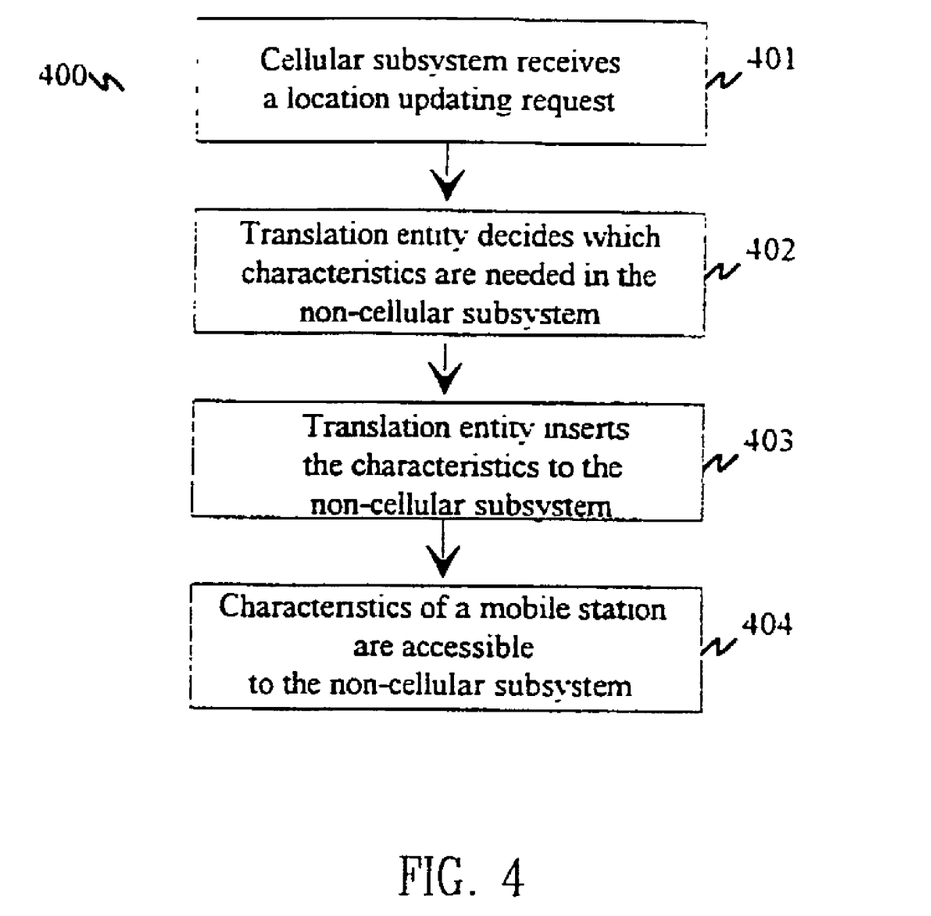
FIG. 4 shows a flow chart of a second preferred embodiment of the method according to the invention.

The mobile station sends a location updating message at least each time it enters a new location area. These location areas consist of a number of cells and a location area may comprise many base station controllers and base stations. The flowchart in FIG. 4 illustrates method 400 which is used to inform the H.323 gatekeeper about the address of a non-H.323 terminal. The mobile station sends the location updating message in step 401 to the cellular subsystem.

The information in the location updating message is forwarded to a translation entity, and the characteristics which need to be sent to the H.323 subsystem is specified in step 402. The translation entity can be situated, for example, in the cellular gateway between the cellular subsystem and the H.323 subsystem. The characteristics of the mobile station comprises the H.323 alias of the mobile station and, for example, the address of the gateway. The H.323 alias can be, for example, the phone number of the mobile phone.

In the next step 403 the characteristics are inserted to the H.323 subsystem, for example, to the database where information about registered H.323 endpoints is stored. The characteristics can be inserted there directly or they can be inserted by the gatekeeper which has received the characteristics through RAS signaling. In a RCP system, for example, the Internet Mobile Cluster that comprises the translation entity may insert the information to the Endpoint Database. After the characteristics of a mobile station have been inserted to the H.323 subsystem, the gatekeeper can access the information when needed in step 404.

The advantage of the second embodiment of the method according to the invention is that the address related to the mobile station is updated every time it enters a new location area. This is a very useful method if behind each cellular gateway that connects a cellular subsystem to the hybrid cellular telecommunication system there is a separate GSM location area. Then the location area can be identified with the gateway, and if the mobile station changes its location to another cellular subsystem of the hybrid cellular telecommunication system, it sends a new location updating message. The gatekeeper is thus informed each time the address related to a certain mobile station changes.

The third embodiment of the method according to the invention uses paging messages. In a GSM system the paging request messages are sent by the network, for example, when a call to a certain mobile station arrives. They are sent in all the cells that belong to the location area where, according to the information stored in a MSC, the mobile station is. The mobile station answers the paging request by a paging response. When the cellular network receives the paging response, it knows in which cell the mobile station is and, further, through which base station controller and base station it is reachable.

Similar paging messages can be used in a system where a hybrid cellular telecommunication system comprises many cellular subsystems, but all these cellular subsystems belong to a single location area. In this case the mobile station sends the location updating message, when it enters the location area for the first time. This location updating causes the registration of the mobile station to the H.323 subsystem, but no address is usually specified for the mobile station at this point. When after this registration the gatekeeper has to route a call to the mobile station, the H.323 subsystem notices that the mobile station is registered and reachable via one of the cellular gateways, but there is no information which cellular gateway to use. All the cellular gateways are paged, and the one through which the mobile station is currently reachable, answers with a paging response.

Figure 5:
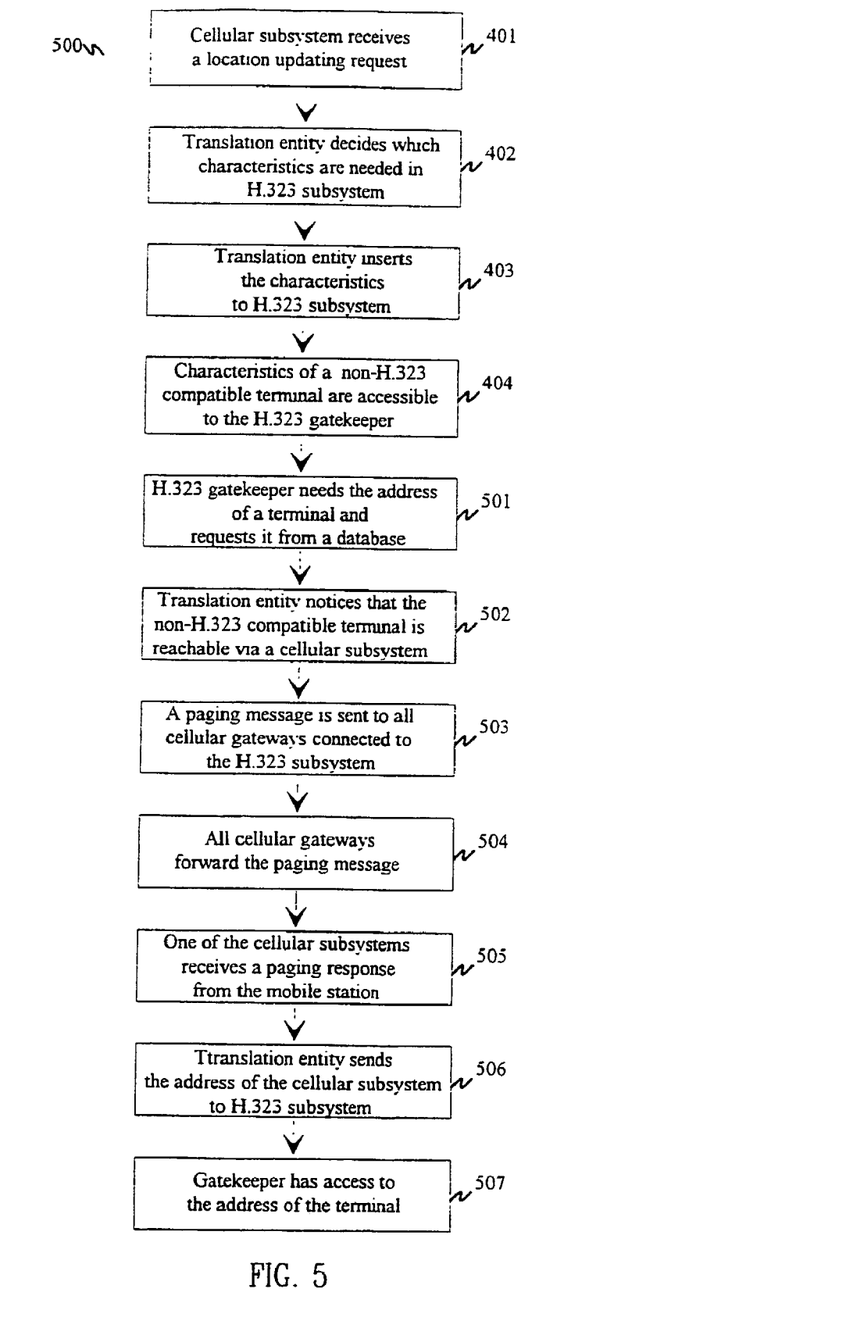
FIG. 5 shows a flow chart of a third preferred embodiment of the method according to the invention.

FIG. 5 presents a flowchart of the second embodiment of a method according to the invention. The first steps of method 500 are similar to those in method 400. In step 401 the mobile station enters one of the cellular subsystems of the hybrid cellular telecommunication system and sends a location updating message. In steps 402 and 403 it is shown, how the translation entity informs the H.323 subsystem about the mobile stations identity. This information can be inserted directly to the database 114 or it can be signaled to the gatekeeper 115. After the information is inserted to the database, the gatekeeper knows that the mobile station is reachable within its zone but it does not know the address of the mobile station.

In step 501 the gatekeeper 115 needs to know the address of the mobile station, for example, because there is an incoming call. In step 502 the H.323 subsystem, for example the database 114, notices that it has an entry stating that the mobile station is within the control zone of the gatekeeper and that it is reachable through one of the cellular subsystems. In step 503 a paging request is sent to all cellular gateways within the control zone of the gatekeeper. In step 504 these gateways forward the paging request further to the base stations, which in turn send it over the air interface. The mobile station answers the paging (step 505). The cellular subsystem that received the paging response transmits this information to a translation entity. The translation entity sends to the H.323 subsystem a message stating, for example, the identity of the mobile station and the address of the serving cellular gateway (step 506). Thereafter the H.323 subsystem, for example the database 114, gives the address of the cellular gateway to the gatekeeper (step 507).

The paging messages in steps 504 and 505 are preferably normal signaling messages of the cellular system. Typical cellular systems have paging signaling messages, so there is no need to make any modifications which are related to the paging signaling in the mobile station, base station or the base station controller. The paging messages in steps 503 and 506 are a part of the functionality of the translation entity. They may be implemented by modifying, for example, the database 114 and the cellular gateway 121. The paging messages may be similar messages as used in cellular systems, but also a specific protocol can be specified between, for example, the database 114 and the cellular gateways for this purpose.

The gatekeeper requests information in step 501 and receives an answer in step 507. Towards the gatekeeper the functionality in steps 502-506 looks like a database look-up that possibly takes a somewhat longer time than database look-ups usually do.

In this third preferred embodiment of the invention the translation entity perform translations between the characteristics eligible to the cellular subsystem and those eligible to the non-cellular subsystem. The gatekeeper asks for an address of a certain H.323 terminal, and the identity of the H.323 terminal is translated to a certain mobile station identity (step 502). Once the mobile station's location has been found out, the location is returned to the gatekeeper as a network address of, for example, the cellular gateway (step 506). In the second preferred embodiment of the invention, only translations from the mobile station characteristics to characteristics of a non-cellular terminal were performed (step 402).

Figure 6:
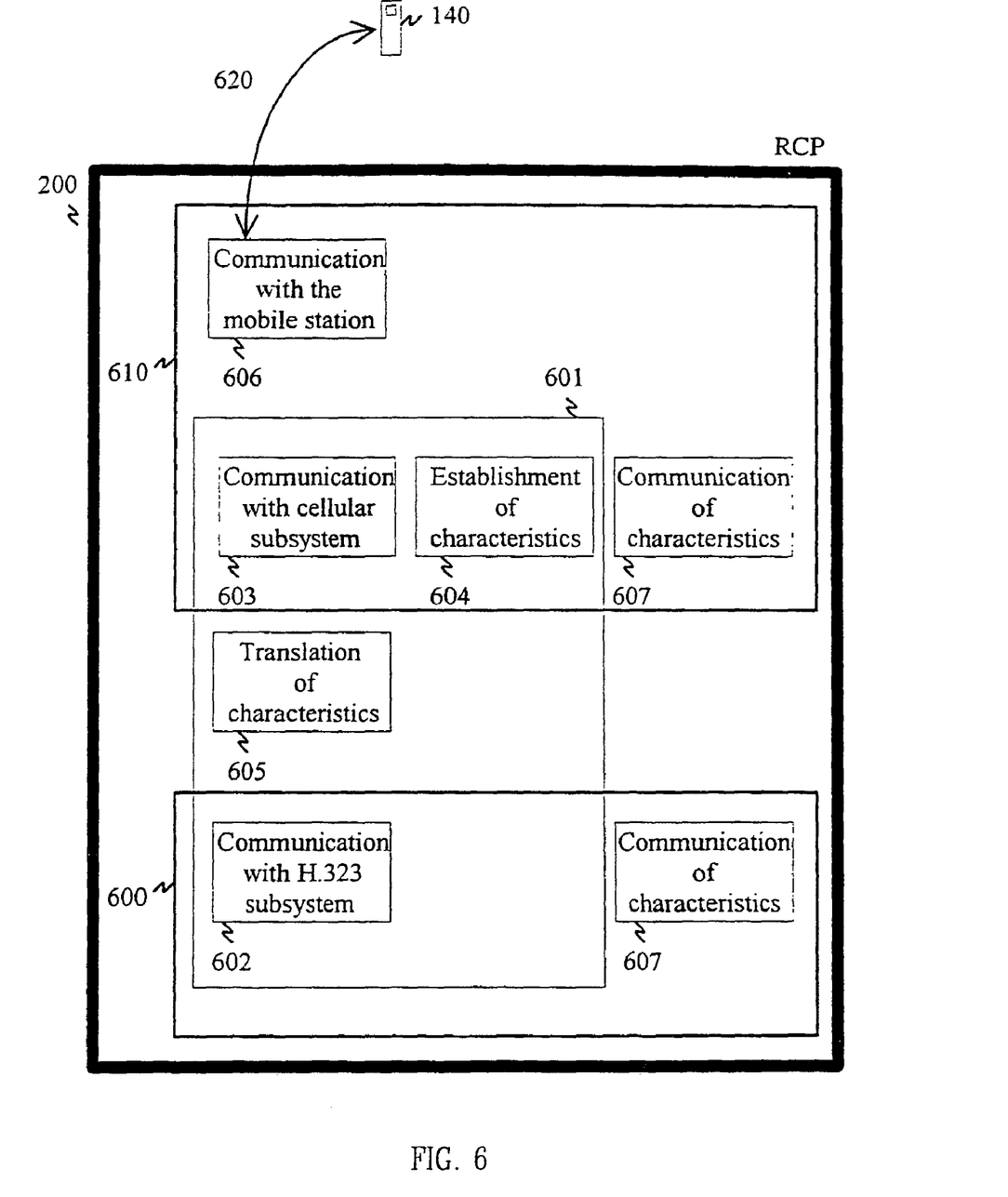
FIG. 6 shows schematic drawings of elements and arrangements according the present invention.

FIG. 6 shows a schematic drawing of a RCP system 200 with an arrangement for transmitting information about a non-H.323 compatible terminal, for example about a mobile station 140, to an H.323 subsystem according to the present invention. The translation arrangement 601 is in the FIG. 6 presented to be implemented in a network element 610 of the cellular subsystem and in a network element 600 of the non-cellular subsystem.

The translation arrangement 601 has a cellular communication block 603 through which information about the characteristics of a mobile station are received. This cellular communication block employs protocols that are defined, for example, in the international standards that treat cellular networks. The translation arrangement also has an establishment block, where the characteristics of a mobile station are derived from the information that is received from the cellular subsystem. In the translation block 605 the characteristics of a mobile station are translated to a format that is format of the characteristics of a non-cellular terminal. These characteristics are then communicated to the non-cellular subsystem using the non-cellular communication block 602. It may, for example, use the LAN 209*a* shown in FIG. 1 and standard H.323 RAS signaling.

Information or queries about the characteristics can be transmitted also from the non-cellular subsystem to the cellular subsystem. Therefore the communication blocks 602 and 603 may support bidirectional communications. The translation block 605 may also perform translations between the two formats of characteristics. The block may be implemented using, for example, microprocessors and suitable program code. The communication blocks may comprise or employ standard I/O devices.

FIG. 6 shows also a cellular network element 610 that comprises some of the functionality of the translation entity. It comprises the cellular communication block 603 which enables it to communicate with other network elements of the cellulai subsystem. It also comprises the establishment block 604 where the characteristics of a mobile station are derived from the information the cellular subsystem provides. The communication block 607 is responsible for transmitting characteristics within the translation entity.

The non-cellular network element 600 comprises the complementary functionality of the translation entity. It comprises the non-cellular communication block 602 for transmitting the characteristics to the non-cellular subsystem, for example to an H.323 subsystem. It has a similar communication block 607 as the cellular network element 610 so that the network elements 600 and 610 can transmit characteristics between themselves.

The translation block 605 may be implemented in either of the network elements 600 and 610. In the translation block 605 the characteristics that are established in block 604 are translated to a format which is accessible for, for example, the H.323 subsystem. The address of the cellular gateway, for example, may be added to the characteristics.

The network element 610 may be, for example, the Internet Mobile Cluster 202 in the RCP system. The network element 600 can be, for example, a modified database 203 or 204.

The name of a given functional entity, such as the base station controller, is often different in the context of different telecommunication systems. For example, in the Universal Mobile Telecommunication System (UMTS) the functional entity corresponding to a base station controller (BSC) is the radio network controller (RNC). Therefore, the particular terminology used to denote various functional entities in this specification are only examples according to the GSM and RCP systems, and do not limit the methods or network elements according to the invention in any way.

Especially the UMTS and UMTS network elements may be used in future hybrid cellular telecommunication systems, and methods and network elements according to the invention may be implemented using UMTS and UMTS network elements.

In the method according to the invention, the mobile station can be any portable device that uses a radio access network for communications.

The combination of the H.323 standard and IP networks has been used as an example of non-cellular telephony network. They do not either limit the methods and techniques that can be used in the non-cellular part of the hybrid cellular telecommunication system. Consequently, the methods and network elements according to the invention are not limited to such methods or network elements that employ the H.323 standard or IP techniques.

A hybrid cellular telecommunication system has been presented here as an example of a telecommunication system that combines cellular network techniques and techniques that are neither cellular nor traditional fixed telephony techniques. The division of such a telecommunication system to the cellular and non-cellular subsystems have been used here to explain the system in a more tangible way. It is not limit the systems where the methods and network elements according to the invention are used to such systems that have all the distinct subsystems described here.

In view of the foregoing description it will be evident to a person skilled in the art that various modifications may be made within the scope of the invention. While a preferred embodiment of the invention has been described in detail, it should be apparent that many modifications and variations thereto are possible, all of which fall within the scope of the invention.

What is claimed is:

1. A method, comprising:

establishing, by a network element of a cellular telecommunication system, communications with a cellular subsystem where first characteristics of a mobile station communicating with the cellular subsystem of a hybrid cellular telecommunication system are established using methods that are defined for the cellular subsystem, said first characteristics of the mobile station being requested by sending a paging request to each cellular subsystem and said first characteristics of the mobile station being established after receiving a paging response from the mobile station, and said first characteristics comprising mobility management information, which comprises at least one of name and address information of the mobile station;

transmitting said first characteristics of the mobile station between a translation entity and the cellular subsystem using methods that are defined for the cellular subsystem, wherein the transmitted first characteristics are translated into second characteristics of the mobile station in the translation entity, and said second characteristics of the mobile station are transmitted from the translation entity to a gatekeeper entity of the non-cellular subsystem, wherein said second characteristics of the mobile station are inserted into a database entity that forms a part of the translation entity and said second characteristics of the mobile station are transmitted between the database entity and elements of the non-cellular subsystem using the methods that are defined for the non-cellular network;

exchanging information about the first characteristics with a network element of a non-cellular subsystem of the hybrid telecommunication system in order to establish in the non-cellular subsystem control information to control connections having one endpoint, at the mobile station, traversing at least the cellular subsystem of the hybrid telecommunication system and being routed in the hybrid cellular telecommunication system by the non-cellular subsystem,
wherein a location updating request is sent by the mobile station upon said mobile station entering the cellular subsystem, an establishment of said first characteristics of the mobile station is initiated by the location updating request.

2. The method of claim 1, wherein the translation entity is located in the cellular subsystem.

3. The method of claim 1, wherein the translation entity is located in the non-cellular subsystem.

4. The method of claim 1, wherein the translation entity is located in a gateway element connecting the cellular subsystem and the non-cellular subsystem.

5. The method of claim 1, wherein said first characteristics of the mobile station are translated into said second characteristics of the mobile station by, at least, giving the mobile station a certain identifier and by defining the address related to said identifier as an address of a gateway connecting the cellular subsystem to the non-cellular subsystem.

6. The method of claim 1, wherein said second characteristics of the mobile station are requested by a gatekeeper entity of the non-cellular subsystem using methods that are defined for the non-cellular subsystem, requested second characteristics of the mobile station are translated into said first characteristics of the mobile station in a translation entity, said first characteristics of the mobile station are requested from the cellular subsystem by the translation entity and an establishment of said first characteristics of the mobile station is initiated by the request of said first characteristics.

7. The method of claim 6, wherein many cellular subsystems are connected to the non-cellular subsystem, each said cellular subsystem is requested to transmit said first characteristics of the mobile station to the translation entity and said first characteristics of the mobile station are transmitted to the translation entity by the cellular subsystem communicating with the mobile station.

8. An apparatus, comprising:
a transceiver configured to communicate with a cellular subsystem of a hybrid cellular telecommunication system using protocols that are defined for the cellular subsystem and to communicate with a non-cellular subsystem using protocols that are defined for the non-cellular subsystem;
an establisher configured to establish first characteristics of a mobile station, said first characteristics of the mobile station being requested by sending a paging request to the cellular subsystem and said first characteristics of the mobile station being established after receiving a paging response from the mobile station, and said first characteristics comprising mobility management information, which comprises at least one of name and address information of the mobile station; and
a translator configured to translate first characteristics of a mobile station into second characteristics of a terminal entity and to translate certain second characteristics of the terminal entity into first characteristics of the mobile station, and said second characteristics of the mobile station are transmitted from the translator to a gatekeeper of the non-cellular subsystem,
wherein said second characteristics of the mobile station are inserted into a database entity that forms a part of the translator and said second characteristics of the mobile station are transmitted between the database entity and elements of the non-cellular subsystem using the methods that are defined for the non-cellular network;
wherein a location updating request is sent by the mobile station upon said mobile station entering the cellular subsystem, an establishment of said first characteristics of the mobile station is initiated by the location updating request, and wherein
the establisher is configured to establish control information about the mobile station in the non-cellular subsystem of the hybrid cellular telecommunication system to control connections having one endpoint at said mobile station, said connections traversing at least a cellular subsystem of said hybrid cellular telecommunication system and being routed in said hybrid cellular telecommunication system by said non-cellular subsystem.

9. The apparatus of claim 8, wherein the translator comprises an establisher to establish an identifier and an address for the mobile station in a format used in the non-cellular subsystem.

10. The apparatus of claim 8, wherein the transceiver configured to communicate with the non-cellular subsystem comprises an inserter configured to insert said second characteristics of a mobile station into a database entity.

11. An apparatus, comprising:
a transceiver configured to communicate with a cellular subsystem;
an establisher configured to establish characteristics of a mobile station, said characteristics of the mobile station being requested by sending a paging request to the cellular subsystem and said characteristics of the mobile station being established after receiving a paging response from the mobile station, and said characteristics comprising mobility management information, which comprises at least one of name and address information of the mobile station; and
an exchanger configured to exchange information about said characteristics with a network element of a non-cellular subsystem of the hybrid telecommunication system, in order to establish in said non-cellular subsystem control information to control connections having one endpoint, at said mobile station, traversing at least a cellular subsystem of said hybrid cellular telecommunication system and being routed in said hybrid cellular telecommunication system by said non-cellular subsystem, said characteristics being translated into a different set of characteristics via a translator and transmitted from the translator to a gatekeeper of the non-cellular subsystem,
wherein said different characteristics of the mobile station are inserted into a database entity that forms a part of the translator and said different characteristics of the mobile station are transmitted between the database entity and elements of the non-cellular subsystem using the methods that are defined for the non-cellular network,
wherein a location updating request is sent by the mobile station upon said mobile station entering the cellular subsystem, an establishment of said characteristics of the mobile station is initiated by the location updating request, and wherein
the apparatus is of the cellular subsystem of the hybrid cellular telecommunication system.

12. The apparatus of claim 11, wherein the translator is configured to translate said characteristics of the mobile station into second characteristics of a terminal entity and to translate the second characteristics of the terminal entity into characteristics of the mobile station.

13. The apparatus of claim 11, wherein the apparatus is a apparatus of a global system for mobile communications network.

14. The apparatus of claim 11, wherein the apparatus is a apparatus of a universal mobile telecommunications system network.

15. An apparatus, comprising:
a transceiver configured to communicate with a non-cellular subsystem comprising a first exchanger configured to exchange information about characteristics of a terminal; and
a second exchanger configured to exchange information about said characteristics with a network element of a cellular subsystem of a hybrid telecommunication system, in order to establish in said non-cellular subsystem control information to control connections having one endpoint, at said terminal, traversing at least part of said hybrid cellular telecommunication system and being routed in said hybrid cellular telecommunication system by said non-cellular subsystem, said characteristics of the mobile station being requested by sending a paging request to the cellular subsystem and said characteristics of the mobile station being established after receiving a paging response from the mobile station, and said characteristics comprising mobility management information, which comprises at least one of name and address information of the mobile station, said characteristics being translated into a different set of characteristics via a translator and transmitted from the translator to a gatekeeper of the non-cellular subsystem,
wherein said different characteristics of the mobile station are inserted into a database entity that forms a part of the translator and said different characteristics of the mobile station are transmitted between the database entity and elements of the non-cellular subsystem using the methods that are defined for the non-cellular network,
wherein a location updating request is sent by the mobile station upon said mobile station entering the cellular subsystem, an establishment of said characteristics of the mobile station is initiated by the location updating request, and wherein
the apparatus is of the non-cellular subsystem of the hybrid cellular telecommunication system.

16. The apparatus of claim 15, wherein the second exchanger includes inserter configured to insert said characteristics into a database entity.

17. The apparatus of claim 15, wherein the translator is configured to translate characteristics of a terminal entity into the different characteristics of the mobile station and to translate the different characteristics of the mobile station into characteristics of the terminal entity.

18. The apparatus of claim 15, wherein the apparatus is an apparatus of a H.323 network.

19. An apparatus, comprising:
communicating means for communicating with a cellular subsystem of a hybrid cellular telecommunication system using protocols that are defined for the cellular subsystem and for communicating with a non-cellular subsystem using protocols that are defined for the non-cellular subsystem;
establishing means for establishing first characteristics of a mobile station, said first characteristics of the mobile station being requested by sending a paging request to the cellular subsystem and said first characteristics of the mobile station being established after receiving a paging response from the mobile station, and said first characteristics comprising mobility management information, which comprises at least one of name and address information of the mobile station; and
translating means for translating first characteristics of a mobile station into second characteristics of a terminal entity and for translating certain second characteristics of the terminal entity into first characteristics of the mobile station, and said second characteristics of the mobile station are transmitted from the translating means to a gatekeeper entity of the non-cellular subsystem,
wherein said second characteristics of the mobile station are inserted into a database means that forms a part of the translating means and said second characteristics of the mobile station are transmitted between the database means and elements of the non-cellular subsystem using the methods that are defined for the non-cellular network,
wherein a location updating request is sent by the mobile station upon said mobile station entering the cellular subsystem, an establishment of said first characteristics of the mobile station is initiated by the location updating request,
wherein the establishing means is for establishing control information about the mobile station in the non-cellular subsystem of the hybrid cellular telecommunication system for controlling connections having one endpoint at said mobile station, said connections traversing at least a cellular subsystem of said hybrid cellular telecommunication system and being routed in said hybrid cellular telecommunication system by said non-cellular subsystem.

20. A apparatus, comprising:
communicating means for communicating with a cellular subsystem;
establishing means for establishing characteristics of a mobile station, said characteristics of the mobile station being requested by sending a paging request to the cellular subsystem and said characteristics of the mobile station being established after receiving a paging response from the mobile station; and
exchanging means for exchanging information about said characteristics with a network element of a non-cellular subsystem of the hybrid telecommunication system, in order to establish in said non-cellular subsystem control information for controlling connections having one endpoint, at said mobile station, traversing at least a cellular subsystem of said hybrid cellular telecommunication system and being routed in said hybrid cellular telecommunication system by said non-cellular subsystem, and said characteristic information comprising mobility management information, which comprises at least one of name and address information of the mobile station, said characteristics being translated into a different set of characteristics via a translator and transmitted from the translator to a gatekeeper of the non-cellular subsystem,
wherein the different characteristics of the mobile station are inserted into a database means that forms a part of the translator and said different characteristics of the mobile station are transmitted between the database means and elements of the non-cellular subsystem using the methods that are defined for the non-cellular network,
wherein a location updating request is sent by the mobile station upon said mobile station entering the cellular subsystem, an establishment of said characteristics of the mobile station is initiated by the location updating request, and wherein the apparatus is of the cellular subsystem of the hybrid cellular telecommunication system.

21. An apparatus, comprising:

communicating means for communicating with a non-cellular subsystem comprising means for exchanging information about characteristics of a terminal; and exchanging means for exchanging information about said characteristics with a network element of a cellular subsystem of a hybrid telecommunication system, in order to establish in said non-cellular subsystem control information for controlling connections having one endpoint, at said terminal, traversing at least part of said hybrid cellular telecommunication system and being routed in said hybrid cellular telecommunication system by said non-cellular subsystem, said characteristics of the mobile station being requested by sending a paging request to the cellular subsystem and said characteristics of the mobile station being established after receiving a paging response from the mobile station, and said characteristics of the mobile station comprising mobility management information, which comprises at least one of name and address information of the mobile station, said characteristics being translated into a different set of characteristics via a translator and transmitted from said translator to a gatekeeper of the non-cellular subsystem, wherein said different characteristics of the mobile station are inserted into a database means that forms a part of the translator and said different characteristics of the mobile station are transmitted between the database means and elements of the non-cellular subsystem using the methods that are defined for the non-cellular network, wherein a location updating request is sent by the mobile station upon said mobile station entering the cellular subsystem, an establishment of said characteristics of the mobile station is initiated by the location updating request, and wherein the apparatus is of the non-cellular subsystem of the hybrid cellular telecommunication system.

* * * * *

UNITED STATES PATENT AND TRADEMARK OFFICE
CERTIFICATE OF CORRECTION

PATENT NO. : 7,583,680 B1
APPLICATION NO. : 10/130894
DATED : September 1, 2009
INVENTOR(S) : Panu Suontausta It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1645 days.

Signed and Sealed this

Fourteenth Day of September, 2010

David J. Kappos
*Director of the United States Patent and Trademark Office*